Feb. 23, 1926. Re. 16,272

D. H. GREEN

SIGNAL

Original Filed Jan. 9. 1923

INVENTOR.
David H. Green
BY M. C. Frank
ATTORNEY.

Reissued Feb. 23, 1926. Re. 16,272

UNITED STATES PATENT OFFICE.

DAVID H. GREEN, OF SAN FRANCISCO, CALIFORNIA.

SIGNAL.

Original No. 1,513,237, dated October 28, 1924, Serial No. 611,560, filed January 9, 1923. Application for reissue filed February 11, 1925. Serial No. 8,573.

*To all whom it may concern:*

Be it known that I, DAVID H. GREEN, a citizen of the United States, residing at San Francisco, in the county of San Francisco and State of California, have invented a new and useful Signal, of which the following is a specification.

My invention relates to improvements in signals, and in particular, to that type of signal adapted chiefly for the use of the automobilist, in signifying his intentions to other drivers and pedestrians as to his direction of travel, or intention to slow down or stop.

The present most approved and preferred method of such signaling, is to extend the arm at various angles in a vertical plane, the angle determining the signal.

Although many mechanical, electrical and other devices are on the market that will perform the equivalent signals, they appear to be unpopular and not favorably accepted by the driving public. From this, I conclude, that the human hand signal will always rank foremost, therefore, I have confined my improvement to operate in conjunction with the human hand, the object being to enhance and emphasize the hand signals given. This, I accomplish, by providing a hand covering or glove, and made in conformance to my invention.

Another object is, the production of such a signal adaptable for use by traffic officers and others, who give motion and direction signals.

A further object is to render night signaling more discernible, and consequently more effective, by incorporating in my invention light-reflecting crystals or brilliants.

The accompanying sheet of drawings forming part of this specification illustrates my invention, and in which.

Referring to the various figures: The numeral 1 represents the hand of the arm 2, and upon which is the hand-covering or glove denoted in its entirety by 3, and fastened on the hand in the usual way.

The glove may be composed of any suitable flexible material used for such purposes, such as soft leather and made up of alternate strips 4 and 5 of material contrasting in color, such as white and black material respectively, or of other contrasting colors. The glove proper may be a unit of one material, and the black strips 5 may be bands sewed thereon. The alternate strips of material should be included on the fingers so that the strips will stand out to better advantage when the fingers are moved.

I prefer to construct the glove thumbless. as shown, to allow full and free hand movement for the steering wheel.

Figure 4:
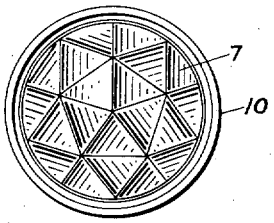
Figure 4 is a plan of one of the brilliants.
Figure 3:
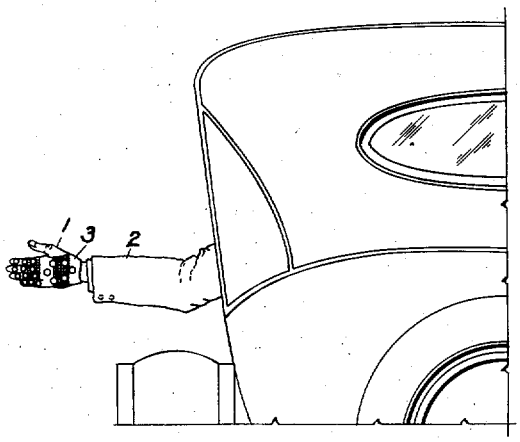
Figure 3 is a view of the invention in use as it appears to one in the rear of the signaling vehicle.
Figure 5:
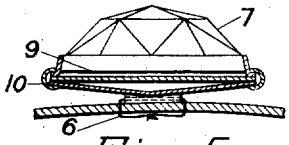
Figure 5 is a side elevation of it, and showing in section, the holder for the brilliant and the manner of attaching the same to the glove.
Figure 1:
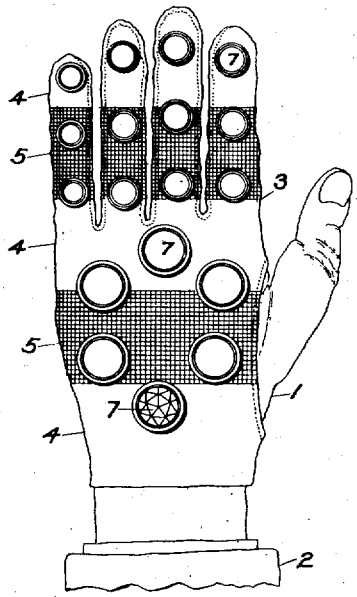
Figure 1 is a front view of it made for a left hand, and, as viewed from behind the signal arm.
Figure 2:
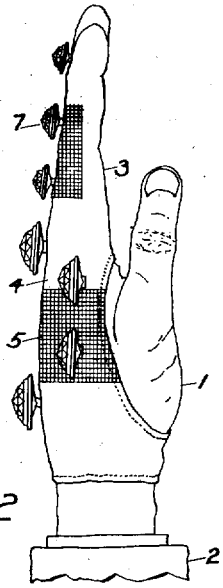
Figure 2 is a side view of it.

To the back of the glove and arranged in any effective order, I attach, preferably by sewing, as seen at 6 in Fig. 5, mounted crystals or brilliants 7. These brilliants are usually of glass. having many facets and ruby tinted in structure. At 9, the underside of the brilliant is silvered for light reflecting purposes, and secured in any preferred mounting 10. These brilliants should be mounted to the fingers as well as to the back of the glove, as the fingers of the hand can then be moved to flicker the brilliants, so to speak, and thus make the light more conspicuous than if the brilliants were only applied to the back of the glove.

The brilliants 7 may be of the same design throughout, but of different sizes and in the nature of buttons, the fingers requiring the smaller sizes.

In operation, a driver desiring to signal, extends his arm as heretofore, and the black and white stripes of my invention visibly accentuate the given signals day or night, and the attached brilliants, positioned and moving at different angles, receive light rays both day and night from various sources and reflect the same in all directions. Owing to the numerous facets, reflections of varying intensities will always be discernible, and this is especially true at night. The red glitterings from my signal being the reflections of the light rays from the head lights of an approaching vehicle in the rear.

While I have thus described the preferred form of my invention, I wish to have it understood that slight changes may be made within the scope of the claims hereto attached without affecting the spirit of the invention.

I claim:

1. A traffic signal, comprising a thumbless glove having white and black cross-stripes positioned alternately on the entire back thereof, and the same studded with colored brilliants for the purpose set forth.

2. A traffic signal, comprising a glove having cross stripes of contrasting colors on the entire back thereof, and the same studded with colored brilliants, said brilliants comprising a plurality of buttons, each button having a separate mounting, and said mountings being flexibly secured to the material of the glove and in spaced relation to one another.

DAVID H. GREEN.